(12) United States Patent
Poon et al.

(10) Patent No.: US 7,365,941 B2
(45) Date of Patent: Apr. 29, 2008

(54) OPTICAL RECORDING HEAD INCLUDING AN OPTICAL RESONANT CAVITY

(75) Inventors: Chie Ching Poon, San Jose, CA (US); Timothy Carl Strand, San Jose, CA (US)

(73) Assignee: Hitachi Global Storage Technologies Netherlands, B.V., Amsterdam (NL)

( * ) Notice: Subject to any disclaimer, the term of this patent is extended or adjusted under 35 U.S.C. 154(b) by 334 days.

(21) Appl. No.: 11/042,616

(22) Filed: Jan. 24, 2005

(65) Prior Publication Data

US 2006/0164960 A1 Jul. 27, 2006

(51) Int. Cl.
*G11B 11/22* (2006.01)

(52) U.S. Cl. ...................................................... 360/125

(58) Field of Classification Search ................ 360/317, 360/59, 243.3, 125; 369/13.05, 13.32, 124.01; 720/659
See application file for complete search history.

(56) References Cited

U.S. PATENT DOCUMENTS

| | | | |
|---|---|---|---|
| 2003/0128452 A1* | 7/2003 | McDaniel et al. ............ 360/59 |
| 2003/0193117 A1* | 10/2003 | Schreiner et al. ........... 264/400 |
| 2004/0062152 A1* | 4/2004 | Stancil et al. ............ 369/13.05 |
| 2006/0067001 A1* | 3/2006 | Hsu et al. ................ 360/234.3 |
| 2006/0090178 A1* | 4/2006 | Stipe ......................... 720/659 |
| 2006/0164960 A1* | 7/2006 | Poon et al. ............ 369/124.01 |
| 2006/0233061 A1* | 10/2006 | Rausch et al. ........... 369/13.32 |

OTHER PUBLICATIONS

Journal of Modern Optics, 2003, vol. 50, No. 15-17, 2543-2550, "Nanofabrication of optical structures and devices for photonics and biophotonics".
"Losses in single-mode silicon-on-insulator strip waveguides and bends", by Yurii A. Vlasov and Sharee J. McNab, IBM T.J. Watson Research Center, Apr. 19, 2004, vol. 12, No. 8, Optics Express 1622.
"High quality-factor whispering-gallery mode in the photonic crystal hexagonal disk cavity", by Han-Youl Ryu and Masaya Notomi, NTT Basic Research Laboratories, Apr. 19, 2004, vol. 12, No. 8, Optics Express 1708.
Journal of Lightwave Technology, vol. 22, No. 3, Mar. 2004, "Optical Spotsize Converter Using Narrow Laterally Tapered Waveguide for Planar Lightwave Circuits", by Takayuki Mizuno et al.
"A Type of Electrical Resonator", by W.W. Hansen, Jul. 17, 1937, Journal of Applied Physics.

(Continued)

*Primary Examiner*—Tianjie Chen
(74) *Attorney, Agent, or Firm*—Robert O. Guillot; Intellectual Property Law Offices

(57) ABSTRACT

An optical recording head including a media heating device to write and read data to a heat sensitive optical media disk. The media heating device includes an optical energy resonant cavity that produces a high intensity near-field optical spot of subwavelength dimension. Optical energy is coupled into the resonant cavity through a waveguide that is placed proximate the cavity, and optical energy is coupled out of the cavity through an aperture that is placed proximate an antinode or post within the cavity. In reading data from the optical media, a photodetector is placed at the end of the waveguide. Optical energy emitted from the end of the waveguide is influenced by the reflectivity of the media data bit, and is interpreted as the data bit signal.

46 Claims, 9 Drawing Sheets

OTHER PUBLICATIONS

Spectrochimica Acta, vol. 31B, pp. 483 to 486, "A cavity for microwave-induced plasmas operated in helium and argon at atmospheric pressure", Jun. 1976.

Spectrochimica Acta, vol. 33B, pp. 53 to 54, "Additional experience with the cylindrical $TM_{010}$ cavity for generating an MIP in helium and argon at atmospheric pressure", Aug. 1977.

"Klystrons and Microwave Triodes", by Donald R. Hamilton, et al., 1964.

"Fields and Waves in Communication Electronics", Second Edition, no date.

"Coupled re-entrant cavity system for electromagnetic levitation" by A.J. Sangster et al., Jul. 1999.

Nature, vol. 424, Aug. 14, 2003, "Optical Microcavities" by Kerry J. Vahala.

"Mode field patterns and preferential mode coupling in planar waveguide-coupled square microcavities" by Chung Yan Fong and Andrew W. Poon, Nov. 3, 2003, vol. 11, No. 22, Optics Express 2897.

"SiON high-refractive-index waveguide and planar lightwave circuits", by G.L. Bona et al., IBM J. Res. & Dev., vol. 47, No. 2/3, Mar./May 2003.

"Antiresonant reflecting optical waveguides in $SiO_2$-Si multilayer structures", by M.A. Duguay et al., Appl. Phys. Lett. 49(1), Jul. 7, 1986.

"Reference Data for Engineers: Radio, Electronics, Computer, and Communications", by Mac E. Van Valkenburg et al., Newnes, 2001.

Optics Letters, vol. 28, No. 15, Aug. 1, 2003, "Ultrahigh light transmission through a C-shaped nanoaperture", by Xiolei Shi et al.

"Resonant-enhanced evanescent-wave fluorescence biosensing with cylindrical optical cavities", by Steve Blair and Yan Chen, Applied Optics, vol. 40, No. 4, Feb. 1, 2001.

Journal of Lightwave Technology, vol. 15, No. 11, Nov. 1997, "FDTD Microcavity Simulations: Design and Experimental Realization of Waveguide-Coupled Single-Mode Ring and Whispering-Gallery-Mode Disk Resonators", S.C. Hagness et al.

Robert G. Hunsperger, Integrated Optics: Theory and Technology, no date.

Physical Review Letters, vol. 91, No. 4, Jul. 25, 2003, "Ideality in a Fiber-Taper-Coupled Microresonant System for Application to Cavity quantum Electrodynamics" by S.M. Spillane et al.

\* cited by examiner

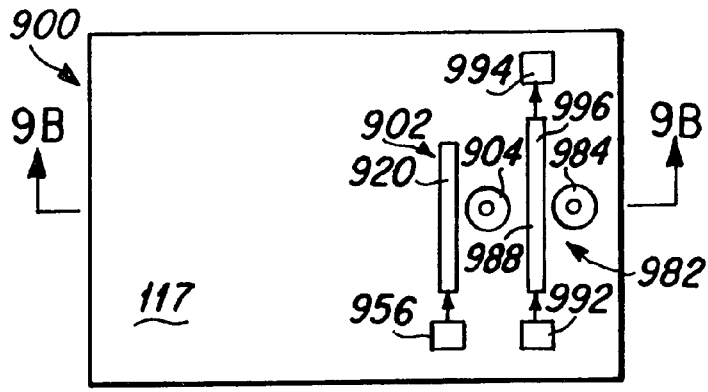
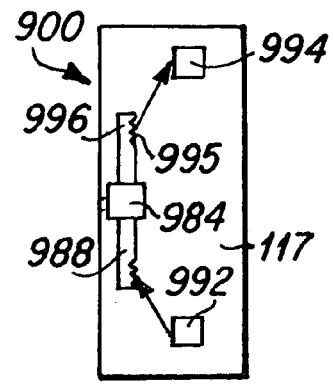
Fig.9A  Fig.9C
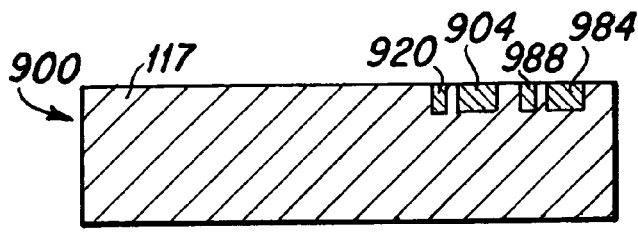
Fig.9B
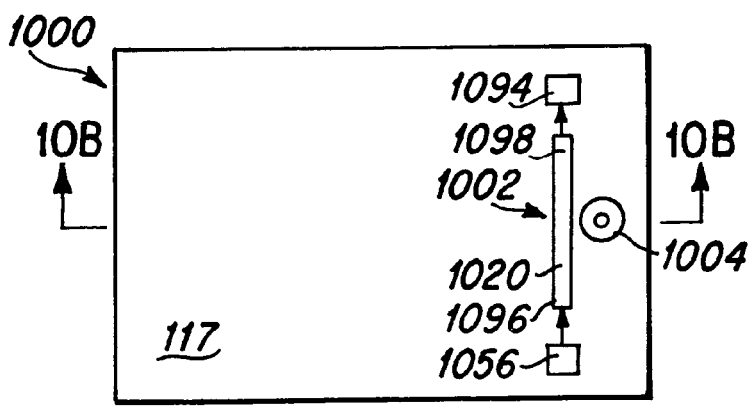
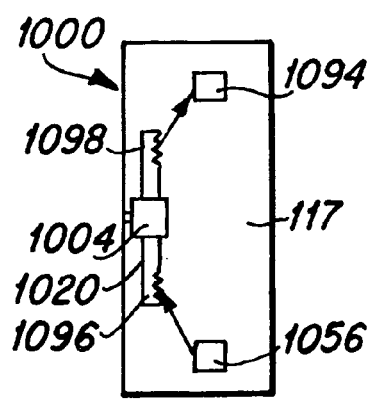
Fig.10A  Fig.10C
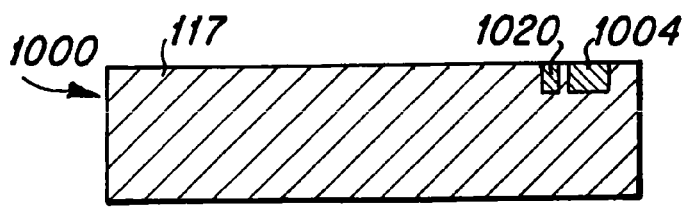
Fig.10B

OPTICAL RECORDING HEAD INCLUDING AN OPTICAL RESONANT CAVITY

BACKGROUND OF THE INVENTION

1. Field of the Invention

The present invention relates generally to optical recording heads that are utilized with optical disk data storage devices, and more particularly to the design and fabrication of a recording head having an optical wavelength resonant cavity media heating device formed therein.

2. Description of the Prior Art

Optical drives generally include one or more rotatable data storage disks having a data storage media layer formed thereon, and data in the form of small areas, termed data bits are written onto the media layer of the disks by a recording head. Optical recording is essentially a thermal process where the thermal energy is delivered to the media optically by means of a small focused spot of light. The size of the spot generally determines the bit size, and the route to higher data areal recording density is to produce smaller spot sizes. The technology of optical recording is outlined below, and is described in numerous references such as "Principles of Optical Disc Systems," G. Bouwhuis, J. Braat, A. Juijser, J. Pasman, G. van Rosmalen and K. Schouhamer Immink, Adam Hilger Ltd., 1985.

For ease of understanding, a schematic diagram of a typical prior art optical drive is depicted in FIG. 1. As depicted therein, the optical drive 10 includes a rotating media disk 14 upon which data is written by optical head. The optical head includes two parts, a stationary head portion 18 which includes a laser and other components, and a movable head portion 22 which typically includes a laser beam directing mirror 26 and a beam focusing lens 30. In the typical optical drive 10, the movable head 22 is disposed upon a linear actuator and moved radially relative to the rotating disk. The laser beam is directed from the stationary head 18 to the mirror 26 of the moving head 22, through the focusing lens 30 to a spot on the media. With conventional optical systems, the spot size scales directly with the laser wavelength and inversely with the numerical aperture (NA) of the focusing lens 30. These are the two main variables that are changed to reduce the spot size to achieve higher data areal recording density.

There are two main rewriteable optical recording technologies: phase change and magneto-optical. In phase change, localized melting of the disk medium, typically composed of a chalcogenide material, followed by a rapid cooling causes the heated spot on the recording material to change to an amorphous state. Melting followed by a slow cooling process causes it to change to a crystalline state. These two states are designed to have different reflectivities so that the recorded signal can be read out as changes in reflectivity when a reading laser beam is subsequently scanned over the data. In reading, the laser power is lowered so that the state of the medium is not affected, i.e. not melted again. For magneto-optical systems, the optical beam is used to heat the medium above its Curie point as a broad area magnetic field is applied. Only the heated area of the medium responds to the applied field and changes its magnetized state accordingly. Readout is done using polarized laser light whose polarization is changed slightly by the state of magnetization of the medium. The polarization of the reflected light is detected to produce the readback signal.

For non-rewritable media, different techniques can be used. For example in write-once media, the laser spot can be used to locally ablate the medium, thus causing a change in reflectivity. Pre-recorded media (e.g. CD'S and DVD's) use physical pits that are stamped in the surface of the disk to encode the data. The present invention can in principle be used for writing either phase change or ablative write-once or magneto-optical media.

One of the principal features of a current prior art optical recording device is that it is able to focus a small (approximately 0.5 micron diameter) spot on the media 14 at a distance of some millimeters from the movable head 22. This has provided high data storage density without the head-disk-interface issues of magnetic recording. However, the spot size reaches diffraction limits somewhere around 0.2 microns given the diode lasers that are currently available. To achieve smaller spots optically, it is necessary to resort to "super-resolution" techniques. The present invention is essentially a super-resolution technique that achieves a factor of perhaps 10 beyond the diffraction limit, whereas most super-resolution concepts provide much less than that. A trade off for this gain in resolution is that the device must operate in the optical near-field, that is from approximately 1 to 100 nm from the media, such that the head-disk separation is a small fraction of the wavelength of light instead of millimeters. This then requires a flying head as is utilized in normal magnetic recording.

One way to achieve super-resolution is to force the light to go through a small aperture. Here the spot size in the near-field of the aperture can be set by the aperture size rather than being limited by the wavelength of the light as in diffraction limited systems. However, the transmittance of sub-wavelength apertures decreases as $r^4$ where r is the radius of the aperture. Thus the transmittance efficiency of sub-wavelength apertures is very poor and high power lasers would be required to heat the medium. Recent work has investigated C apertures and other special apertures which have higher efficiencies than normal sub-wavelength apertures. The present invention combines sub-wavelength apertures, potentially including C apertures or similar devices, with an optical resonant cavity to amplify the intensity incident on the aperture and thus increase overall efficiency of transmitting light from the laser source to the medium.

In order to understand the operation of an optical resonant cavity it is useful to first consider the resonance of a simple circular cylindrical cavity at microwave frequencies, i.e., the cavity is a hollow circular cylinder. In microwave electronics, a closed circular cylinder has well defined resonances represented by transverse magnetic $TM_{mnp}$ modes and transverse electric $TE_{mnp}$ modes. The indices m, n, and p refer to the number of modes in the azimuthal, radial and longitudinal directions, respectively. For the present case, we limit our discussions to the fundamental mode, $TM_{010}$, i.e., there are no variations in the azimuthal and longitudinal directions. In this simple mode the magnetic field for $TM_{010}$ is concentric with the cylinder. On the other hand, the electric field is in the axial direction and has a maximum in the center of the cylinder. All its electric field lines span between the two side walls.

In an effort to increase the electric field in a circular cylindrical cavity, the reentrant cylindrical cavity resonator 112 shown in FIGS. 2A and 2B was developed for the generation of microwave power with klystrons and magnetrons. This cavity 112 is simply a circular cylindrical cavity with a coaxial post 116 which is shorter than the thickness of the cavity. The post extends from one side wall 120 and ends at a subwavelength distance, d, from the opposite side wall 124. An aperture 128, usually of subwavelength diameter, is placed in the side wall 124 opposite to the end of the post 116. The presence of the post 116 compounds the designation of the resonant modes. However, the cavity 112 is normally operated to resonate in a fundamental mode such that the electric and magnetic fields are axisymmetric. Further, the electric field at the post end remains parallel to the axis and peaks at or near the axis. Also, the magnetic field is perpendicular to the electric field such that its field lines are concentric circles about the axis. The presence of the post 116 intensifies the electric field at the axis because the post to side wall separation, d, is now smaller than the thickness of the cylinder. Generally, the smaller the magnitude of d, the greater the axial electric field strength along the axis. What these experiments in the microwave regime have demonstrated is that a reentrant cylindrical cavity of subwavelength dimensions can produce very high intensity electric field in a direction normal to the face 124 of the cavity, a fact that is extended in the present invention for near-field thermal heating at optical wavelengths.

Since any modification to a resonant cavity, such as a post or an aperture, perturbs the simple TE and TM modes in the cavity, in the following we will refer to axial modes where the fields in the original, unmodified resonant cavity would have been TM and will use in-plane modes to refer to fields which would have been TE in the unmodified resonant cavity. Thus for a circular cylindrical cavity, axial fields will imply that the electric field is predominantly oriented parallel to the axis of the cylinder and in-plane fields will imply that the electric field is predominantly perpendicular to the axis of the cylinder and thus in the plane of the air bearing surface.

An important consideration in using an optical resonant cavity for near-field heating is in coupling the optical power into the resonant cavity 112. A known technique in optical communication in coupling power into a circular cylindrical optical cavity is by way of evanescent-wave coupling from an integrated waveguide. As an example of this, R. W. Boyd et al., in Journal of Modern Optics, 2003, Vol. 50, No. 15-17, 2543-2550, "Nanofabrication of optical structures and devices for photonics and biophotonics" teaches a system consisting of a waveguide coupled to a resonant whispering gallery mode (WGM) cavity. The technique is schematically represented in FIGS. 2C and 2D where a tapered planar waveguide 140 is placed near a circular disk microcavity 144. The coupling can be effected if the waveguide 140 is placed with a gap 148 that is a fraction of a wavelength from the cavity. In this device the cavity and waveguide are comprised of a relatively high index of refraction material 150 such as GaAs that is surrounded by a relatively low index of refraction material, in this case air. The upper and lower surfaces of the waveguide and cavity are likewise bordered by layers 152 of relatively low index of refraction material, such as $Al_xGa_{1-x}As$, where x equals 0.4.

Recently, descriptions of several thermal recording methods for near-field heating of media in the context of thermally assisted magnetic recording have been published. These incorporate an optical heating device in a conventional magnetic recording head. In published U.S. patent applications US2003/0184903 A1 and US2004/0008591 A1 special high transmission near-field apertures disposed within a magnetic head are taught for applications in perpendicular recording. In one example, a near-field aperture is located immediately downtrack of the write pole of the magnetic head such that the input plane of the near-field aperture is parallel to the air bearing surface (ABS). In published U.S. patent applications US2004/0001420 A1 and US2004/0062503 A1 a planar waveguide is constructed on the downtrack side of the write pole of a magnetic head. In general the size of the heated spot depends on the optical wavelength, the aperture dimensions and the composition of the materials for the waveguide/near-field aperture.

As will be understood from the following description, the present invention employs near-field thermal heating for an optical recording medium using a resonant cavity. The application is similar to conventional optical recording systems. However, there are key differences, notably: (1) the heated spot can be as small as 20 nm (compared to about 700 nm in current diffraction limited optical storage devices with a red or near IR laser); (2) since it is limited to near-field heating, there is no focusing mechanism between the optical head and the disk; (3) the read/write bandwidth of this optical head from the perspective of the cavity is about 1 GHz or greater because the estimated time scale to reach resonance in the resonant cavity for a pulsed input is a few hundred femtoseconds.

SUMMARY OF THE INVENTION

An embodiment of a recording head of the present invention includes a media heating device that is fabricated within the recording head structure to write and read data to a heat sensitive optical media disk. The media heating device includes an optical energy resonant cavity that produces a high intensity near-field optical beam of subwavelength dimension that is appropriate for recording at 1 Tbits/$in^2$ and beyond. Optical energy is coupled into the resonant cavity through a waveguide that is placed proximate the cavity, and optical energy is coupled out of the cavity through an aperture that is placed proximate an antinode within the cavity. In reading data from the phase change media, a photodetector is placed at the end of the waveguide. Optical energy emitted from the end of the waveguide is influenced by the reflectivity of the media data bit, and is interpreted as the binary data bit signal.

It is an advantage of the recording head of the present invention that it includes an improved media heating element to facilitate the writing and reading of data to an optical media disk.

It is another advantage of the recording head of the present invention that it provides high efficiency coupling of light from a source into the media by means of a resonant cavity and specially designed coupling mechanism.

It is a further advantage of the recording head of the present invention that it provides a heated bit spot that is scalable as bit density increases beyond 1 Tbits/$in^2$.

It is yet another advantage of the recording head of the present invention that it includes a reading head that utilizes a resonant cavity and waveguide, where a detector provides an output signal that is controlled by variations in the light output from the waveguide.

It is yet a further advantage of the recording head of the present invention that it does not require optical focusing between the head and the disk, as is required in common optical recording heads.

It is still another advantage of the recording head of the present invention that refractive optical components are not necessary in writing and reading data from the media.

It is an advantage of the optical drive of the present invention that it includes a recording head having an improved media heating element, whereby higher data areal storage densities of the optical drive can be obtained.

It is another advantage of the optical drive of the present invention that it includes a recording head having an improved media heating element, whereby data storage disks having a heat sensitive media layer can be written upon.

It is a further advantage of the optical drive of the present invention that it includes a recording head that includes a reading head that utilizes a resonant cavity and waveguide, where a detector provides an output signal that is controlled by variations in the light output from the waveguide.

It is yet another advantage of the optical drive of the present invention that it includes a recording head having a heating element that provides high efficiency coupling of light from a source into the media by means of a resonant cavity and specially designed coupling mechanism.

It is yet a further advantage of the optical drive of the present invention that it includes a recording head having a media heating element that provides a heated spot that is scalable as bit density increases beyond 1 Tbits/in$^2$.

It is still another advantage of the optical drive of the present invention that it includes a recording head that does not require optical focusing between the head and the disk, as is required in common optical recording heads.

It is still a further advantage of the optical drive of the present invention that it includes a recording head in which refractive optical components are not necessary in writing and reading data from the media.

These and other features and advantages of the present invention will no doubt become apparent to those skilled in the art upon reading the following detailed description which makes reference to the several figures of the drawing.

IN THE DRAWINGS

The following drawings are not made to scale as an actual device, and are provided for illustration of the invention described herein.

FIGS. 2A and 2B depict a cylindrical microwave reentrant cavity resonator of the prior art, wherein FIG. 2A is a top plan view and FIG. 2B is a side cross-sectional view taken along lines 2B-2B of FIG. 2A;

FIGS. 2C and 2D depict a prior art system for coupling light from a source through a waveguide to a resonant cavity, wherein FIG. 2C is a top plan view and FIG. 2D is a side cross-sectional view taken along lines 2D-2D of FIG. 2C;

FIGS. 4A, 4B and 4C depict a first embodiment of a recording head of the present invention that includes an optical energy resonant cavity media heating device, wherein FIG. 4A is a plan view taken from the ABS, FIG. 4B is a cross-sectional view taken along lines 4B-4B of FIG. 4A, and FIG. 4C is an end elevational view;

FIGS. 5A, 5B and 5C depict another embodiment of a recording head of the present invention that includes an optical energy resonant cavity media heating device, wherein FIG. 5A is a plan view taken from the ABS, FIG. 5B is a cross-sectional view taken along lines 5B-5B of FIG. 5A, and FIG. 5C is an end elevational view;

Figure 6A:
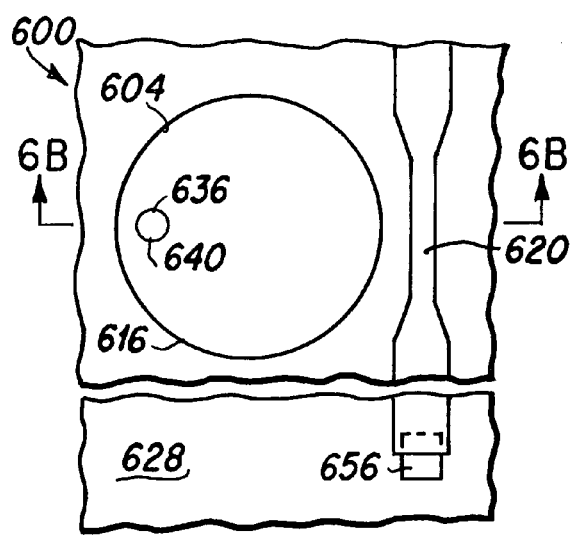
Figure 6C:
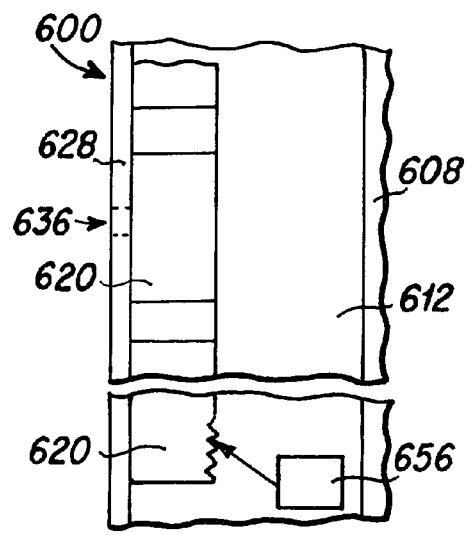
Figure 6B:
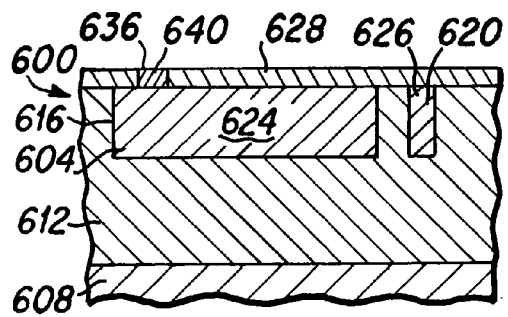
Figure 7A:
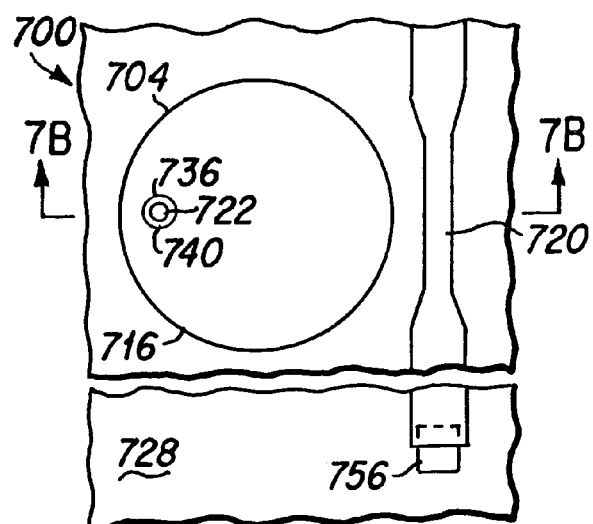
Figure 7C:
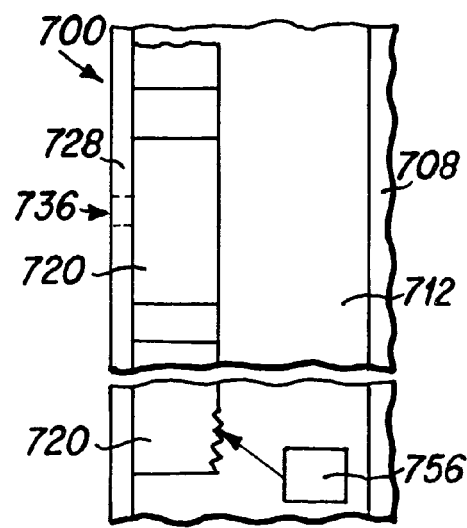
Figure 7B:
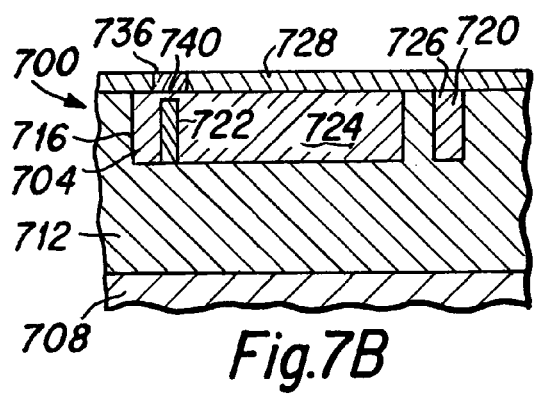
Figure 8A:
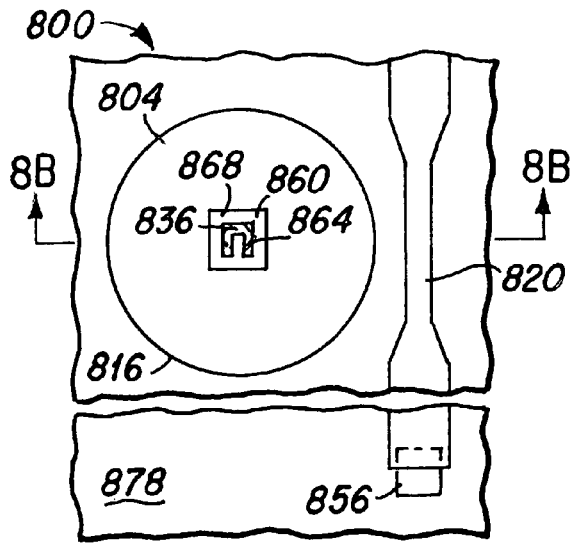
Figure 8C:
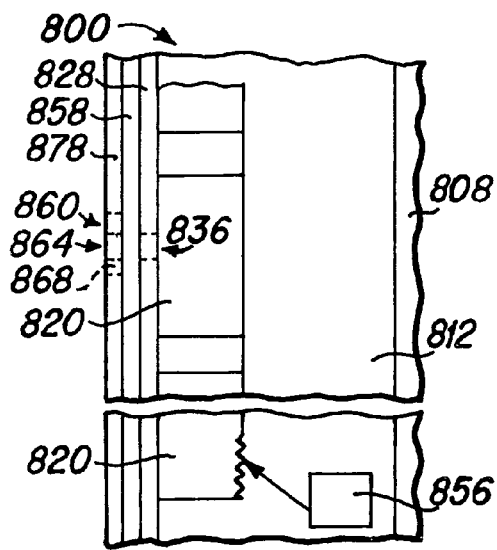
Figure 8B:
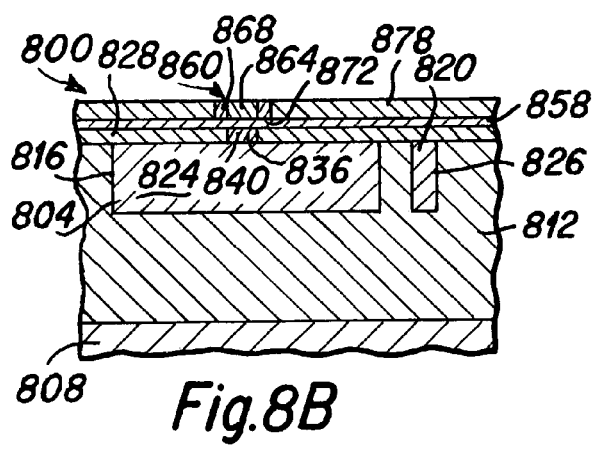

FIGS. 6A, 6B, and 6C depict another embodiment of a recording head of the present invention that includes an optical energy resonant cavity media heating device, wherein FIG. 6A is a plan view taken from the ABS, FIG. 6B is a cross-sectional view taken along lines 6B-6B of FIG. 6A, and FIG. 6C is an end elevational view;

FIGS. 7A, 7B, and 7C depict another embodiment of a recording head of the present invention that includes an optical energy resonant cavity media heating device, wherein FIG. 7A is a plan view taken from the ABS, FIG. 7B is a cross-sectional view taken along lines 7B-7B of FIG. 7A, and FIG. 7C is an end elevational view;

FIGS. 8A, 8B, and 8C depict another embodiment of a recording head of the present invention that includes an optical energy resonant cavity media heating device, wherein FIG. 8A is a plan view taken from the ABS, FIG. 8B is a cross-sectional view taken along lines 8B-8B of FIG. 8A, and FIG. 8C is an end elevational view;

FIGS. 9A, 9B and 9C depict a recording head of the present invention including both a data writing optical resonant cavity device and a data reading optical resonant cavity device, wherein FIG. 9A is a plan view taken from the air bearing surface, FIG. 9B is a cross-sectional view taken along lines 9B-9B of FIG. 9A, and FIG. 9C is an end elevational view;

FIGS. 10A, 10B and 10C depict an alternative recording head embodiment of the present invention in which the data writing optical resonant cavity device and data reading optical resonant cavity device are merged into a single cavity with a single waveguide, wherein FIG. 10A is a plan view taken from the air bearing surface, FIG. 10B is a cross-sectional view taken along lines 10B-10B of FIG. 10A, and FIG. 10C is an end elevational view.

Figure 11A:
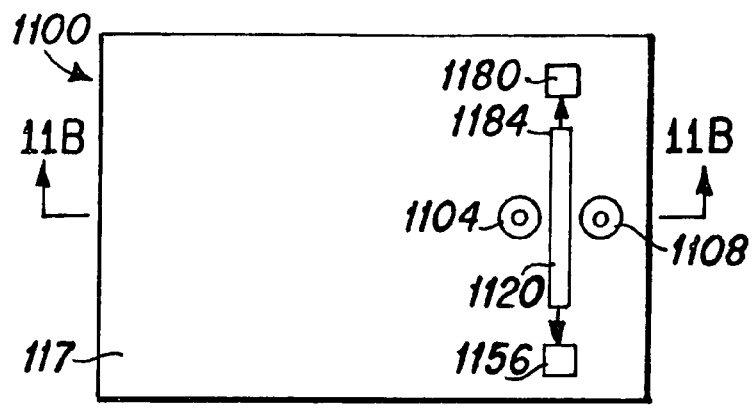
Figure 11C:
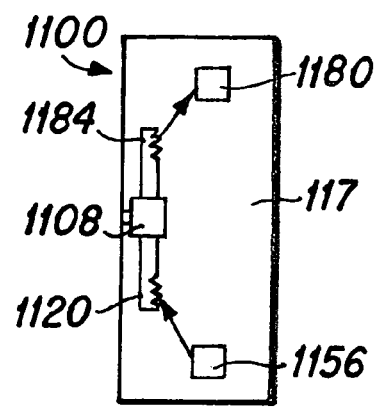
Figure 11B:
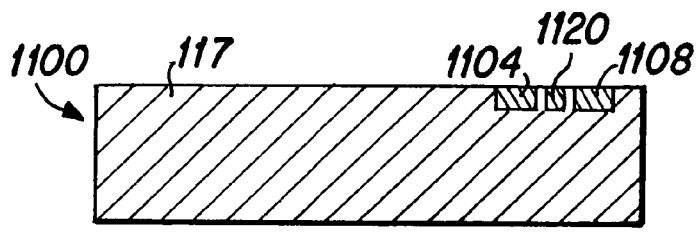

FIGS. 11A, 11B and 11C depict an alternative recording head embodiment of the present invention in which the waveguide of the data writing optical resonant cavity device and the waveguide of the data reading optical resonant cavity device are merged into a single waveguide, wherein FIG. 11A is a plan view taken from the air bearing surface, FIG. 11B is a cross-sectional view taken along lines 11B-11B of FIG. 11A, and FIG. 11C is an end elevational view.

DETAILED DESCRIPTION OF THE PREFERRED EMBODIMENTS

The recording head of the present invention is utilized to read and write data to a heat sensitive media, such as within an optical disk in an optical drive. It is to be understood that an optical drive of the present invention may include optical media that is a phase change media, a magneto optical media or an ablative media; however, for simplicity, the present invention will be described with reference to phase change media, it being understood that the present invention is adaptable for use with all types of optical media.

Figure 1:
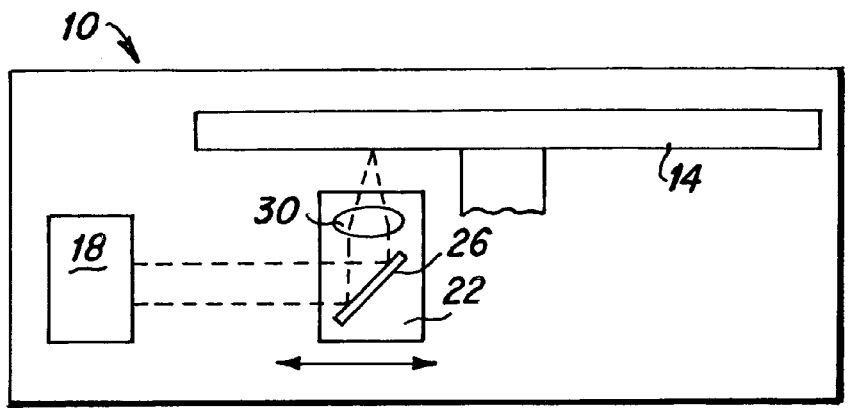
FIG. 1 is a schematic diagram of a prior art optical drive with a linear actuator.
Figure 2A:
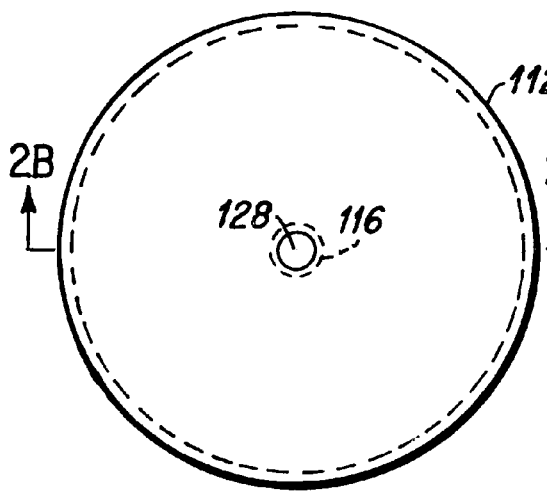
Figure 2C:
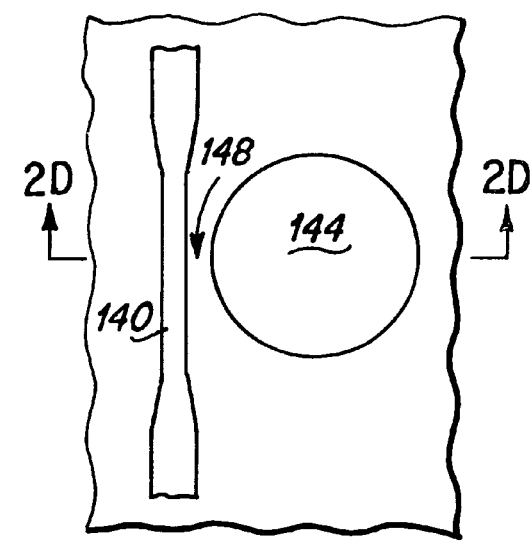
Figure 2B:
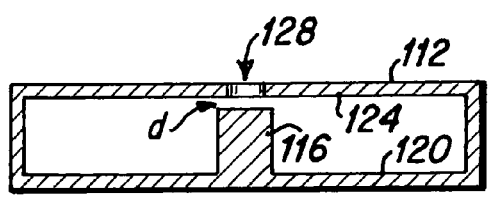
Figure 2D:
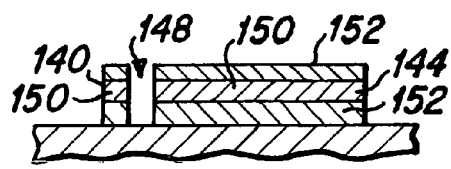
Figure 3A:
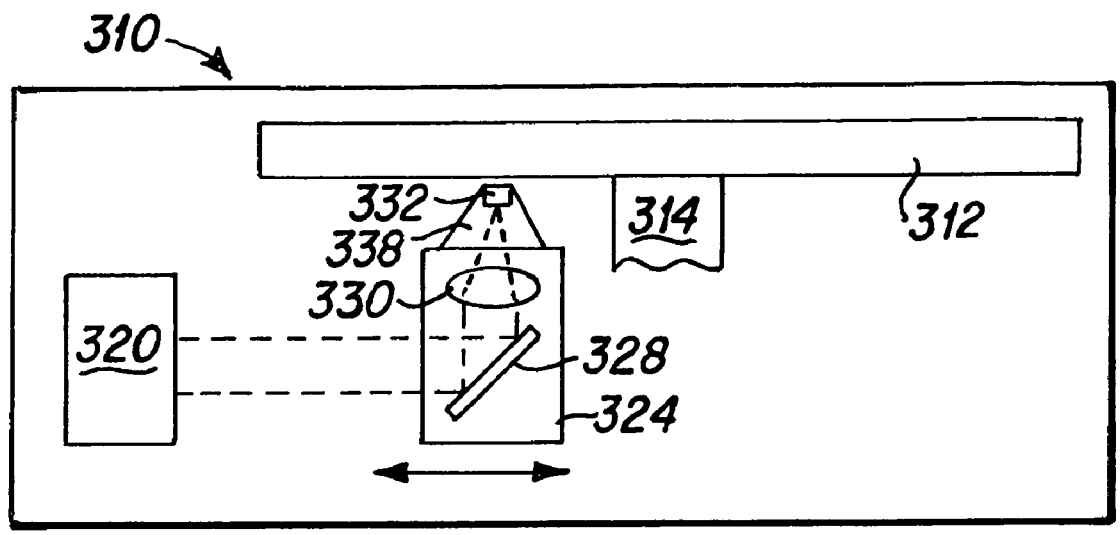
FIG. 3A is a schematic diagram of an optical drive with a linear actuator of the present invention including a recording head of the present invention.

A simplified diagram of an optical drive 310 of the present invention having a linear actuator for supporting an optical reading head of the present invention is presented in FIG. 3A. This optical drive 310 may include similar components to the prior art linear optical drive 10 depicted in FIG. 1. As depicted in FIG. 3A, the linear optical drive 310 includes at least one optical disk 312 that is rotatably mounted upon a spindle 314. An optical head that is comprised of two parts, a stationary head portion 320 which includes a laser and other components, and a movable head portion 324 that is mounted upon a linear actuator and moves radially relative to the rotating disk. The movable head 324 includes a laser beam deflecting mirror 328, a focusing lens 330 and an optical recording head 332 of the present invention. The recording head 332 is mounted in a recording head support mechanism 338 that is similar to the head support mechanisms utilized to support prior art magnetic heads of hard disk drives in flying on an air bearing above the surface of a rotating hard disk. Therefore, as will be understood from the following description, in a fabrication process similar to that used to fabricate magnetic heads, a recording head 332 of the present invention is formed upon a slider body surface that is subsequently mounted upon a support mechanism 338 of the movable head 324 to fly above the surface of each rotating disk 312. When the optical drive 310 is operated, the optical disk 312 rotates upon the spindle 314 and the optical head 332 acts as an air bearing in flying above the surface of the rotating disk. In a further alternative embodiment (not shown) of a linear optical drive, the laser may be fabricated within the flying optical recording head 332 as a laser diode (described herebelow). In this embodiment there is no need for a laser on the stationary head 320, and no need for the mirror 328 and the lens 330.

Figure 3B:
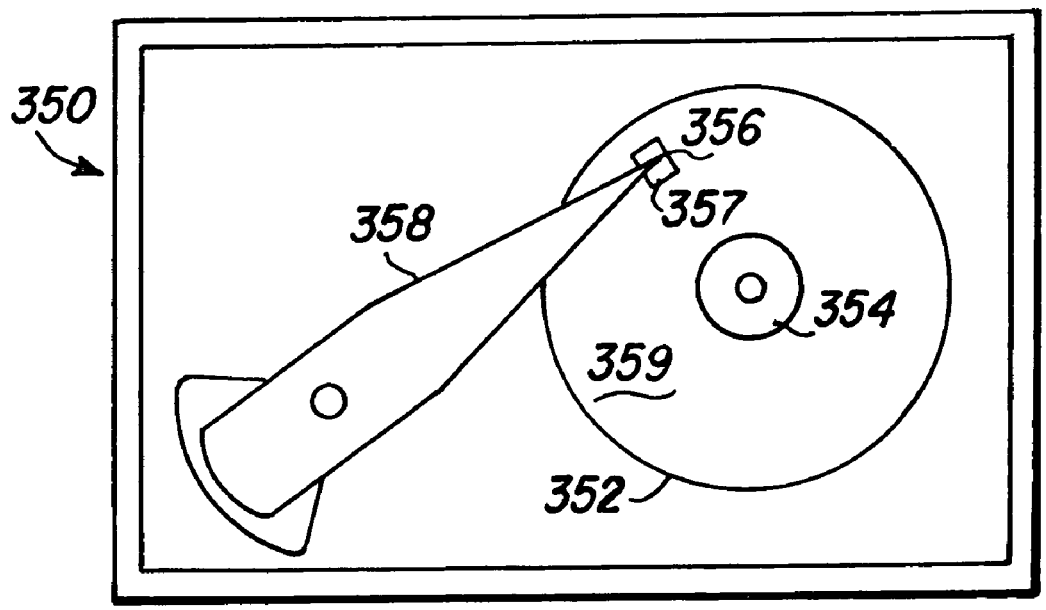
FIG. 3B is a schematic top plan view of a rotary optical drive of the present invention including a recording head of the present invention.

A simplified top plan view of another optical drive embodiment 350 of the present invention having a rotary actuator for supporting the optical head is presented in FIG. 3B, wherein at least one optical disk 352 is rotatably mounted upon a spindle 354. An optical recording head 356 of the present invention is formed upon a slider 357 that is mounted upon a rotary actuator arm 358 to fly above the surface 359 of each rotating disk 352. When the optical drive 350 is operated, the optical disk 352 rotates upon the spindle 354 and the slider acts as an air bearing in flying above the surface of the rotating disk. In this optical drive 350, the laser may comprise a laser diode that fabricated within the optical recording head 356, as is described in detail herebelow.

As is described hereinbelow, the present invention includes optical recording heads having improved media heating devices that comprise optical energy resonant cavity systems for enabling thermal recording for 1 Tbits/in$^2$ and beyond. A general discussion of such resonant cavity optical systems is next presented, followed by a detailed discussion of their implementation in the recording head embodiments of the present invention.

The resonant cavity optical system for a recording head consists of three separate elements which have to be designed to work together. The main component is a resonant cavity that provides high optical fields to improve the efficiency of coupling light from the recording head to the recording medium. A means for bringing light from a laser source into the resonant cavity is also required; this is preferably a waveguide that is tapered and located close to the cavity in a manner to maximize coupling from the waveguide to the cavity. Finally, a means of coupling light from the cavity to the medium in a small, localized area on the order of 25 nm in diameter is needed.

In order to achieve a resonant condition, it is essential that the cavity dimensions and material properties be closely matched to the wavelength. A given cavity will only resonate at certain specific wavelength regions which are determined by the cavity dimensions and optical properties. The width of the regions over which the cavity resonates is determined by the Q factor. The higher the Q factor, the narrower is the wavelength region that will resonate. The Q in turn is determined mainly by losses in the cavity. The cavity dimensions and properties would be designed to resonate at a certain target wavelength. However, since the exact dimensions and optical properties will vary in the manufacturing process and will also vary according to environmental factors like temperature and humidity, it may be necessary to tune the cavity and/or wavelength to get the desired resonant condition. The preferred embodiment uses a tunable laser so that the wavelength can be changed to match the resonant condition of the cavity. It is also possible to tune the cavity, e.g. thermally or electro-optically, to match a given wavelength. The size of the cavity relative to the wavelength also determines what kinds of modes are allowed. For the circular cylinder cavities, we generally use the lowest order mode. In that case we design the cavity small enough so that higher order modes are not allowed. Since WGM modes are inherently higher order modes, WGM cavities must in general be larger so that they support the WGM modes.

The goal of this invention is to produce a very strong optical field on the recording medium using a resonant optical cavity. These cavities are generally circular cylindrical or ring structures, although they may also be rectangular or photonic crystal structures. The ring structure, in particular, can be of an elongated shape to form a racetrack-shaped ring structure. The field inside these cavities can be enhanced over the field used to feed the cavity by a large factor equal to the Q, or quality factor of the cavity. Q values of >1 are commonly quoted and values $10^5$-$10^9$ have been demonstrated in simulations. The large field enhancement in the cavity means larger fields can be delivered to the medium even if the transmission efficiency through the aperture of the cavity is low. The cavity is created as a dielectric material that is shaped to the desired cavity dimensions and disposed within the recording head, where the dielectric material is non-absorbing at the optical wavelengths used to excite the cavity. For a wavelength in the 1-2 μm range, silicon (Si) can be used as the cavity material. Cavities and waveguides can be integrated on a silicon-on-insulator (SOI) wafer, while other commonly used materials are silica-on-silicon and silicon oxy-nitride (SiON). Gallium arsenide and other III-V materials are also often used when sources (e.g. semiconductor lasers) or other active optical devices are integrated in the same structure, and they may also be incorporated within the present invention.

Light can be confined in the cavity by a number of well-known methods that all produce an interface that reflects the light. The simplest of these methods is an interface with a dielectric material of lower index of refraction as is used in step index optical fibers. Other methods include a reflective metal coating, a reflective dielectric thin film stack, a gradient index interface, an overlay of high index material, an overlay of a reflective grating, an anti-resonant reflective structure or a photonic crystal structure. For the purposes of this invention, dielectric interfaces will generally be the preferred method although metal interfaces may be used on the top and/or bottom faces to help confine the field that is coupled out of the cavity into the recording medium.

The dimensions of the cavity are determined by the wavelength of the light in the material, the confinement method and the cavity mode being used. For $TM_{010}$ mode in a silicon circular cylindrical cavity surrounded by air at a wavelength (in air) of 1.55 μm, the cavity diameter would be on the order of 340 nm. In order to assure only the lowest order modes are allowed in the axial direction, the cavity thickness should be less than $\lambda_{eff}/2$, where $\lambda_{eff}$ is the wavelength in the cavity. For the Si cavity at 1.55 μm, this means the thickness should be <220 nm. For this invention, higher order modes can also be employed. Whispering gallery modes (WGM), where there are a string of maxima around the periphery of the circular cylinder, may be used. In this case the cavity can be several microns in diameter.

Given a resonant cavity, mechanisms are required to bring light into the cavity and then again to couple light out of the cavity and into the recording medium. In practice, these elements all need to be designed in conjunction with the cavity and the recording medium to optimize the overall performance, but they are next discussed separately for simplicity. In general, a semiconductor laser will be used as the light source, and this invention uses a waveguide to bring light from the source to the resonant cavity. Although not necessary, for simplicity the waveguide will in general be similar to the cavity in terms of the materials and film thicknesses used to fabricate it. Light from the laser can be coupled into the waveguide in a number of commonly known ways. If the laser and waveguide are on the same substrate, the laser can be directly butt-coupled into the waveguide with good efficiency. If not, a spot size reducer can be put on the end of the waveguide and the laser can be focused onto it, or a grating or prism coupler can be placed on the waveguide for coupling. When properly designed, all of these methods can have good coupling efficiency. Techniques for designing waveguide, waveguide couplers and related waveguide components are well known and described in the literature such as "Integrated Optics: Theory and Technology," R. G. Hunsperger, third edition, Springer-Verlag, 1991.

To couple light from the waveguide to the cavity, the waveguide is generally tapered down and brought into close proximity to the cavity. An example of a waveguide coupled to a resonant cavity with both on the same substrate is presented in R. W. Boyd et al., in Journal of Modern Optics, 2003, Vol. 50, No. 15-17, 2543-2550, "Nanofabrication of optical structures and devices for photonics and biophotonics". When properly designed, this coupling can be close to 100% efficient and the field intensity in the cavity will be larger than the field in the waveguide by a factor of Q.

Finally it is required to couple the light out of the cavity and into the recording medium. This can be done resonantly or non-resonantly. Since the cavity has very high fields internally, any non-resonant aperture or perturbation placed on the cavity will result in good field strength outside the cavity. As an example of this, Boyd et al. teaches placing a small absorbing particle on top of the cavity at the location of a field maximum, whereupon nearly 100% of the light from the waveguide is coupled through the cavity and out at the particle location, resulting in very strong fields at the particle. In the present invention, output coupling at a small localized area can be achieved by making a small diameter aperture in the cavity face at the location of a field maximum and leaving it open or filling it with a material whose index of refraction is different from that of the cavity material. It is important to realize that this is one area where the design of the output coupling mechanism is tightly bound to the design of the cavity and to the recording medium. Introducing a perturbation will alter the cavity resonance slightly as will the presence of the recording medium in the near-field of the cavity. These effects have to be taken into consideration in the design. With proper design, the output coupling can also be done resonantly to maximize the overall coupling to the recording medium. An example of this is the microwave reentrant cavity described above where a metal post is placed in the cavity whose dimensions are chosen to achieve resonance. This greatly enhances the field at the output of the cavity, which in the microwave case is a hole in the cavity located below the post. A second approach is to use what will be referred to as a near-field aperture, as is described herebelow.

A technique similar to the microwave resonant cavity may be employed for the optical cavity of the present invention by fabricating a metal post in the resonant cavity at the location of a field maximum. The post dimensions and shape are designed to achieve a resonance with the field in the cavity producing an intense electric field beneath the post. The lateral extent of the intense field is determined by the post diameter. This post and aperture diameter can be much smaller than the wavelength used. In the microwave reentrant cavity example (Reference: A. J. Sangster, et al., in Journal of Electromagnetic Waves and Applications, 2001, Vol. 15, 815-821, "Coupled re-entrant cavity system for electromagnetic levitation"), the post and aperture diameters were between $0.052\lambda$ and $0.17\lambda$. For the optical case, using $\lambda=1.55$ μm and a silicon cavity, this would mean an aperture diameter of about 23 nm which is in the range for 1 Tbit/in$^2$ recording. This again assumes resonance conditions with axial electric fields.

The resonant cavity approach can also be used for in-plane fields. For axial fields, the preferred cavity is one with a post, as in the reentrant cavity. For both in-plane and axial fields either a cylindrical disk or race-track cavity can be used in either low order modes or WGM. These cavities can be used with either a simple aperture or a near-field aperture, where we define a near-field aperture as one which has enhanced intensity transmission in the near-field. An example of this is the so-called C aperture, which has been described by X. Shi and L. Hesselink in Journal of the Optical Society of America B, 200.4, Vol. 21, No. 7, 1305-1317, "Design of a C aperture to achieve λ/10 resolution and resonant transmission". Near-field apertures can be designed for either axial or in-plane fields, although the design details will differ. Combining the near-field aperture with the resonant cavity again multiplies its efficiency by providing very high fields behind the near-field aperture. Although the metal post is the preferred embodiment for this invention, any other resonant structure that produces a small localized field can be used. Five embodiments to illustrate the application of resonant cavities for optical recording are next discussed.

Figure 4A:
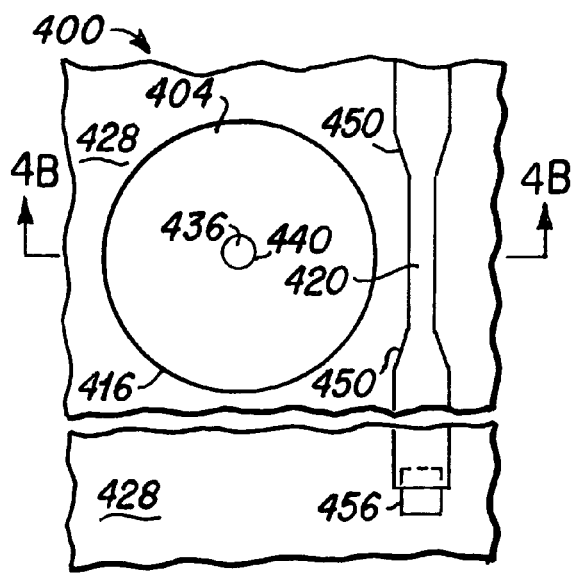
Figure 4C:
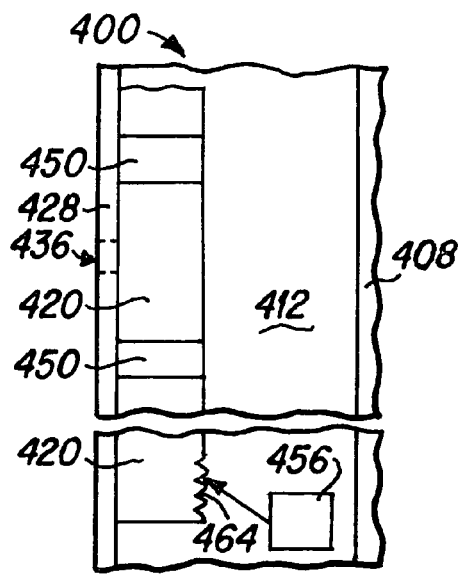
Figure 4B:
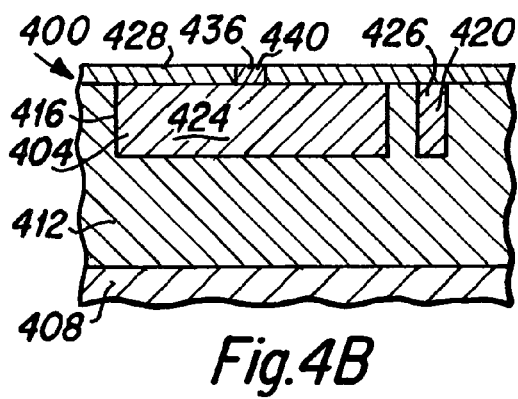

FIGS. 4A, 4B and 4C depict a first embodiment 400 of a recording head of the present invention that includes an optical energy resonant cavity media heating device 404, wherein FIG. 4A is a plan view taken from the ABS, FIG. 4B is a cross-sectional view taken along lines 4B-4B of FIG. 4A, and FIG. 4C is a side elevational view of FIG. 4A. As depicted in FIGS. 4A, 4B and 4C, the head embodiment 400 includes a substrate base 408, which may be comprised of AlTiC, SiO$_2$, or other materials as are well known to those skilled in the art. A layer of relatively low index of refraction material 412 is deposited across the surface of the substrate 404, and a cavity 416 in the size and shape of an optical resonant cavity is then formed within the low index of refraction material, such as by using photolithographic techniques as are well known to those skilled in the art. A waveguide shaped cavity 420 may also be simultaneously formed. Thereafter, the resonant cavity 416 and waveguide cavity 420 are filled with relatively high index of refraction material 424 and 426, respectively, which typically will be the same material. Thereafter, an outer surface layer 428 of relatively low index of refraction material is deposited across the upper surface of the device to enclose the resonant cavity and waveguide materials. Alternatively, layer 428 could be omitted, leaving an air interface, or it can consist of a metal film. Subsequently, an aperture 436 is fabricated at the cavity central axis location through the outer surface layer 428 of the resonant cavity 404. Thus, the cavity 404, consisting of a dielectric material 424 of high index of refraction (e.g., silicon for 1-2 μm wavelength), is formed in a matrix of another dielectric material 412 that has lower index of refraction (e.g., SiO$_2$), such that the fields are confined within the cavity. The small aperture 436 is formed and filled with a material 440 that has a different index of refraction than the cavity dielectric material 424 such as a different dielectric material or air. The outer surface layer 428 may serve as part of the air bearing surface (ABS) of the recording head 400. If the layer 428 is omitted, the aperture 436 is formed in the cavity material 424.

At resonance in a fundamental mode at the input wavelength, the cavity 404 creates very high electric field and evanescent waves that emanate at the aperture 436 and parallel to the cavity central axis. The output energy, with electric fields mainly normal to the outer layer 428 of the cavity in the preferred embodiment, extends through the aperture 436 and down into the phase change medium to produce thermal heating. Although the size of the aperture 436 can affect the resonant behavior of the cavity at the selected wavelength, the cavity design can be data bit geometry specific. This means the aperture dimensions can be selected for a required heated data bit spot size. It is important to note that an increase in bit density of an optical drive necessitates a decrease in dimensions of aperture 436 to create the reduced size data bits. In this respect, it is possible to rescale the aperture dimensions since the aperture defines the location and dimensions of the heated spot.

For a fundamental mode with axial fields, the diameter of the cavity 404 is typically about 70% of the effective wavelength of the radiation, where the effective wavelength is defined as the quotient of the freespace wavelength divided by the index of refraction of the cavity material. For 1.55 µm waves in a silicon cavity, the cavity diameter is approximately 0.32 µm.

By way of analogy, the dimensions of a data bit for 1 Tbit/in$^2$ would be of the order of 25 nm. In this respect, a suitable aperture 436 would be about 25 nm in diameter. It is to be understood that these cavities can be designed for other wavelengths as is well known to those skilled in the art. Going to different wavelengths requires using compatible materials. As the wavelength and the materials change, the cavity dimensions will scale with the refractive index of the material.

In order to produce high efficiency coupling of light into the cavity 404, the optical waveguide 420, which may be tapered down 450 near the cavity, is placed in the vicinity of the cavity to provide the coupling. The coupling of light from the waveguide has been described above and is well understood by those skilled in the art.

Coupling the light source such as a solid state diode laser 456 to the waveguide 420 can be accomplished by one of several methods, where the source 456 may be an integrated component of the slider 117 (for example, see FIG. 9B described herebelow), but may also be a separate component as is depicted in FIG. 3A and described above. One coupling method is best seen in FIG. 4C, in which a grating coupler consisting of grating lines 464 that are formed on a surface of the waveguide away from the side facing the ABS. The source 456 is appropriately focused and set at an angle of incidence for best coupling. Alternatively, light can be directly coupled into the end of the waveguide away from the cavity. These coupling methods are well known and described in references such as "Integrated Optics: Theory and Technology," R. G. Hunsperger, third edition, Springer-Verlag, 1991.

In performing a "write" operation, light from a pulsed source 456 is coupled to the cavity 404 via the waveguide 420. Each pulse establishes resonance in the cavity such that the optical field extends through the aperture 436 to reach the media. For phase change media the absorbed light melts the media and causes it to change into the amorphous phase. This process is repeated for each pulse. Even for large high Q cavities, the time for the cavity to build up to its full resonant energy is <1 ns. Modeling results for such cavities are shown in "FDTD Microcavity Simulations: Design and Experimental Realization of Waveguide-Coupled Single-Mode Ring and Whispering-Gallery-Mode Disk Resonators", S. C. Hagness, D. Refizadeh, S. T. Ho and A. Taflove, Journal of Lightwave Technology, Vol 15, No. 11, November 1997, pp2154-2165. This suggests that the bit writing rate can be 1 GHz or higher with the appropriate cavity size, pulse width, medium thickness, substrate thermal properties, and other material requirements.

Figure 5A:
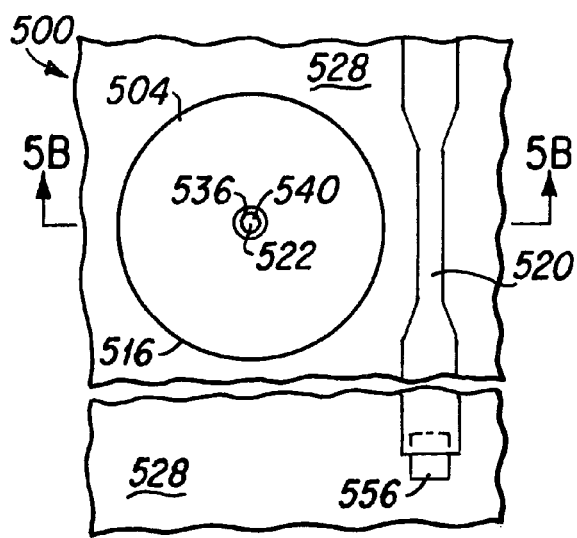
Figure 5C:
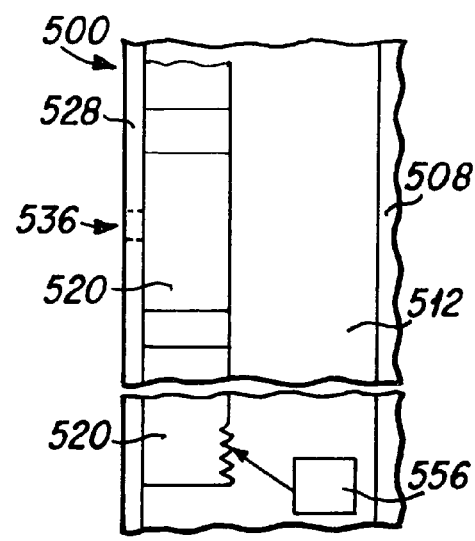
Figure 5B:
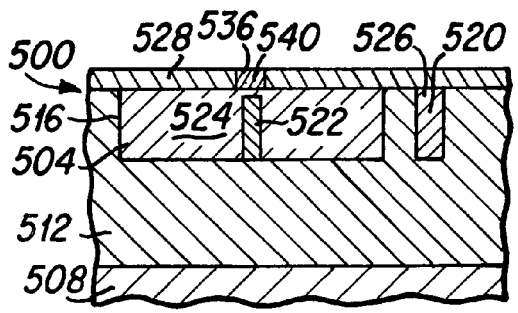

A second embodiment 500 of a recording head of the present invention that includes a reentrant cavity media heating device 504 is depicted in FIGS. 5A, 5B and 5C, wherein FIG. 5A is a plan view taken from the ABS, FIG. 5B is a cross-sectional view taken along lines 5B-5B of FIG. 5A, and FIG. 5C is a side elevational view of FIG. 5A. As depicted therein, the head embodiment 500 includes a substrate base 508, which may be comprised of AlTiC, SiO$_2$, or other materials as are well known to those skilled in the art. A layer of relatively low index of refraction material 512 is deposited across the surface of the substrate 508, and a cavity 516 in the size and shape of an optical resonant cavity 504 is then formed within the low index of refraction material 512. A waveguide shaped cavity 520 may also be simultaneously formed. A narrow post 522 is next fabricated within the cavity. The post is preferably comprised of a material such as silver, gold, aluminum, rhodium, platinum, chromium, among others, and is formed utilizing photolithographic and/or electroplating techniques that are well known to those skilled in the art. Alternatively, the post may be formed of a dielectric material and surface coated with a metal such as those identified above. Thereafter, the resonant cavity 516 and waveguide cavity 520 are filled with relatively high index of refraction material 524 and 526, respectively. Thereafter, an outer surface layer 528 of relatively low index of refraction material is deposited across the upper surface of the device to enclose the resonant cavity and waveguide materials. Alternatively, layer 528 could be omitted, leaving an air interface, or it can consist of a metal film. Subsequently, an aperture 536 is fabricated at the cavity central axis location through the outer surface layer 528 of the resonant cavity and immediately above the post 522. Thus, the cavity 504, consisting of a dielectric material 524 of high index of refraction (e.g., silicon for 1-2 µm wavelength), is formed in a matrix of another dielectric material 512 that has lower index of refraction (e.g., SiO$_2$), such that the fields are confined within the cavity. The small aperture 536 is formed and filled with a material that has a different index of refraction than the cavity dielectric material 524, such as a different dielectric material or air. If the layer 528 is omitted, the aperture 536 is formed in the cavity material 524. The recording head 500 thus includes a reentrant optical resonant cavity that is operated in a mode similar to the resonant cavity 400 depicted in FIGS. 4A and 4B and described hereabove.

Although the size of the post 522 can affect the resonant behavior of the cavity 504 at the selected wavelength, the cavity design can be post geometry and post dimensions specific. This means the aperture 536 and post 522 dimensions can be designed to produce resonance for related cavity dimensions and required heated spot size. It is important to note that a decrease in bit density necessitates a decrease in post and aperture dimensions. In this respect, it is possible to rescale the post and aperture dimensions since the post defines the locations of maximum electric field and the heated spot, and the aperture defines the size of the heated spot.

In order to provide high efficiency coupling of light into the cavity 504, an optical waveguide 520 is placed in the vicinity of the cavity 504 to provide the coupling. The construction of the waveguide 520 and its coupling to the diode laser source 556 is similar to that depicted in FIGS. 4A, 4B and 4C and described above.

A third embodiment 600 of the present invention involves the use of a whispering gallery mode (WGM) resonant cavity 604 which is depicted in FIGS. 6A, 6B and 6C, wherein FIG. 6A is a plan view taken from the ABS, FIG. 6B is a cross-sectional view taken along lines 6B-6B of FIG. 6A, and FIG. 6C is a side elevational view of FIG. 6A. WGM cavities as well as other types of resonant cavities are reviewed in "Optical Microcavities", K. J. Vahala, Nature, Vol. 424, 14 Aug. 2003, 839-846. As depicted in FIGS. 6A, 6B and 6C, the head embodiment 600 includes a substrate base 608, which may be comprised of AlTiC, $SiO_2$, or other materials as are well known to those skilled in the art. A layer of relatively low index of refraction material 612 is deposited across the surface of the substrate, and a cavity 616 in the size and shape of an optical WGM resonant cavity is then formed within the low index of refraction material 612. A waveguide shaped cavity 620 may also be simultaneously formed. Thereafter, the resonant cavity 616 and waveguide cavity 620 are filled with relatively high index of refraction material 624 and 626, respectively. An outer surface layer 628 of relatively low index of refraction material is next deposited across the upper surface of the device to enclose the resonant cavity and waveguide material. Alternatively, layer 628 could be omitted, leaving an air interface, or it can consist of a metal film. Subsequently, an aperture 636 is fabricated at an appropriate location (as is next described) through the outer surface layer 628 of the resonant cavity. Thus, the cavity 604, consisting of a dielectric material 624 of high index of refraction (e.g., silicon for 1-2 μm wavelength), is formed in a matrix of another dielectric material 612 that has lower index of refraction (e.g., $SiO_2$), such that the fields are confined within the cavity. The small aperture 636 is formed and filled with a material 640 that has a different index of refraction than the dielectric material 624, such as a different dielectric material or air. If the layer 628 is omitted, the aperture 636 is formed in the cavity material 624.

The exact location of the aperture 636 within the WGM cavity space is carefully selected such that it is at the same radial and azimuthal locations as an antinode of a resonant mode at the input wavelength. The output energy, with electric fields mainly normal to the face of the cavity, can extend to and penetrate into the magnetic medium to produce thermal heating. Although the size of the aperture 636 can affect the resonant behavior of the cavity at the selected wavelength, the cavity design can be aperture geometry and aperture dimensions specific. This means the aperture dimensions can be designed to produce resonance for given cavity dimensions and required heated spot size. It is important to note that an increase in bit density necessitates a decrease in aperture dimensions.

In order to provide high efficiency coupling of light into the cavity 604, an optical waveguide 620 is placed in the vicinity of the cavity 604 to provide the coupling. The construction of the waveguide 620 and its coupling to a diode laser source 656 is similar to that depicted in FIGS. 4A, 4B and 4C and described above.

A fourth embodiment of a recording head 700 of the present invention is depicted in FIGS. 7A, 7B and 7C, wherein FIG. 7A is a plan view taken from the ABS, FIG. 7B is a cross-sectional view taken along lines 7B-7B of FIG. 7A, and FIG. 7C is a side elevational view of FIG. 7A. As is next described, the fourth embodiment 700 includes a reentrant WGM resonant cavity 704 that includes a post 722 formed within the cavity. The head embodiment 700 includes a substrate base 708, which may be comprised of AlTiC, $SiO_2$, or other materials as are well known to those skilled in the art. A layer of relatively low index of refraction material 712 is deposited across the surface of the substrate, and a cavity 716 in the size and shape of an optical WGM resonant cavity is then formed within the low index of refraction material 712. A waveguide shaped cavity 720 may also be simultaneously formed. The post is preferably comprised of a material such as silver, gold, aluminum, rhodium, platinum, chromium, among others, and is formed utilizing photolithographic and/or electroplating techniques that are well known to those skilled in the art. Alternatively, the post may be formed of a dielectric material and surface coated with a metal such as those identified above. Thereafter, the resonant cavity 716 and waveguide cavity 720 are filled with relatively high index of refraction material 724 and 726, respectively. Thereafter, an outer surface layer 728 of relatively low index of refraction material is deposited across the upper surface of the device to enclose the resonant cavity and waveguide material. Alternatively, layer 728 could be omitted, leaving an air interface, or it can consist of a metal film. Subsequently, an aperture 736 is fabricated at an appropriate location (as described below) through the outer surface layer 728 of the resonant cavity. Thus, the cavity 704, consisting of a dielectric material 724 of high index of refraction (e.g., silicon for 1-2 μm wavelength), is formed in a matrix of another dielectric material 712 that has lower index of refraction (e.g., $SiO_2$), such that the fields are confined within the cavity. The small aperture 736 is formed and filled with a material that has a different index of refraction than the cavity dielectric material 724, such as a different dielectric material or air. If the layer 728 is omitted, the aperture 736 is formed in the cavity material 724.

The exact location of the post 722 within the cavity is carefully selected such that it is at the same radial and azimuthal location as an antinode of a resonant mode, at the input wavelength. The end of the post is slightly retracted from the face 724 of the cavity. A WGM mode resonance at the input wavelength can provide very high electric fields normal to the plane of the aperture 736 opposite to the post 722. The output energy, with electric fields mainly normal to the face 728 of the cavity, can extend to and penetrate into the magnetic medium to produce thermal heating. Although the size of the aperture 736 and post 722 can affect the resonant behavior of the cavity, the cavity design can be post geometry and post dimensions specific. This means the aperture dimensions can be designed to produce resonance for given post dimensions and required heated spot size. It is important to note that an increase in bit density necessitates a decrease in post and aperture dimensions. In this respect, it is possible to rescale the post and aperture dimensions since the post defines the locations of maximum electric field and the heated spot, and the aperture dimensions determine the size of the heated spot.

In order to provide high efficiency coupling of light into the cavity 704, an optical waveguide 720 is placed in the vicinity of the cavity 704 to provide the coupling. The construction of the waveguide 720 and its coupling to a diode laser source 756 is similar to that depicted in FIGS. 4A, 4B and 4C and described above.

A fifth embodiment 800 of the present invention is depicted in FIGS. 8A, 8B and 8C that includes an optical energy resonant cavity media heating device 804 and a near-field aperture 860, wherein FIG. 8A is a plan view taken from the ABS, FIG. 8B is a cross-sectional view taken along lines 8B-8B of FIG. 8A, and FIG. 8C is a side elevational view of FIG. 8A. As depicted therein, the magnetic head embodiment 800 includes a substrate base 808, which may be comprised of AlTiC, $SiO_2$, or other materials as are well known to those skilled in the art. A layer of relatively low index of refraction material 812 is deposited across the surface of the substrate 808, and a cavity 816 in the size and shape of an optical resonant cavity is then formed within the low index of refraction material, such as by using photolithographic techniques as are well known to those skilled in the art. A waveguide shaped cavity 820 may also be simultaneously formed. Thereafter, the resonant cavity 816 and waveguide 820 cavity are filled with relatively high index of refraction material 824 and 826 respectively, which typically will be the same material. Thereafter, an outer surface layer 828 of relatively low index of refraction material is deposited across the upper surface of the device to enclose the resonant cavity and waveguide materials. Alternatively, layer 828 could be omitted, leaving an air interface, or it can consist of a metal film. Subsequently, an aperture 836 is fabricated at the cavity central axis location through the outer surface layer 828 of the resonant cavity 804. Thus, the cavity 804, consisting of a dielectric material 824 of high index of refraction (e.g., silicon for 1-2 μm wavelength), is formed in a matrix of another dielectric material 812 that has lower index of refraction (e.g., $SiO_2$), such that the fields are confined within the cavity. The small aperture 836 is formed and filled with a material 840 that has a different index of refraction than the cavity dielectric material 824, such as a different dielectric material or air. If the layer 828 is omitted, the aperture 836 is formed in the cavity material 824. The cavity 804 is similar to those described above (404, 504, 604 and 704) and may be fabricated either with a post or without a post; the construction of the waveguide 820 and its coupling to a diode laser source 856 is similar to that described above.

A near-field aperture 860 is next fabricated above the aperture 836. To accomplish this, a thin film 858 having a thickness of approximately 10 nm is deposited upon the layer 828, where the thin film 858 is comprised of a material that is transparent to the optical energy. Thereafter, a metallic thin film piece 868 having an opening 864 formed therein is fabricated within a further thin film layer 878 upon the layer 858. The film 858 can be composed of a material that acts as an etch stop in the fabrication of the near-field aperture 860. The metallic film 868 may be comprised of a material, such as silver, gold, aluminum, rhodium, platinum, chromium and others, the metal film 868 being a fraction of a wavelength thick. In the case of the near-field aperture 860 the shape of the opening 864 of the near-field aperture can resemble the character C (described by X. Shi and L. Hesselink in Journal of the Optical Society of America B Vol. 21, No. 7, 1305-1317, "Design of a C aperture to achieve λ/10 resolution and resonant transmission") or the character H. Other opening geometries which can deliver a near-field optical energy spot of enhanced intensity and subwavelength dimensions can also be used. The axis of the opening 864 of the near-field aperture is preferably coaxial with the aperture 836 of cavity. FIG. 8A depicts the case where there is no post inside cavity 804; the case where a post is present is not shown, but will be well understood by those skilled in the art upon reviewing this disclosure. The near-field aperture 860 can be designed for use with either in-plane or axial fields. However, where a post is present it is understood that axial fields are preferred.

The output energy, with electric fields mainly normal to the face 828 of the cavity, can extend to and penetrate into the near-field aperture 860 to produce enhanced transmission and therefore thermal heating at the magnetic medium. The size of the aperture 836 is selected to optimize coupling of this beam to the size of the near-field aperture 864. Since the size of the aperture 836 can affect the resonant behavior of the cavity 804, the cavity design can be adjusted for best performance of the coupled cavity-near-field aperture operation. This means the aperture dimensions for the cavity 804 can be designed to produce resonance for a given post (if present) and required heated spot size for the near-field aperture 860.

The optical resonant cavity devices described hereabove can be utilized to both write data to a phase change, ablative or magneto-optical medium disk, or read data from a phase change or ablative media disk. A recording head 900 that is adapted for both writing and reading operations is next described with the aid of FIGS. 9A, 9B and 9C, wherein FIG. 9A is a plan view of the ABS surface of a recording head 900, FIG. 9B is a cross-sectional view taken along lines 9B-9B of FIG. 9A, and FIG. 9C is a side elevational view of FIG. 9A. As is depicted in FIGS. 9A, 9B and 9C, the recording head 900 includes a first resonant cavity device 902 for writing data to a phase change media disk. The first resonant cavity device 902 includes an optical energy resonant cavity 904, a waveguide 920 and an optical energy source 956. The resonant optical cavity 904 may be comprised of any of the resonant cavities 404, 504, 604, 704 or 804 that have been described hereabove, and the coupling of optical energy from the laser source 956 to the waveguide 920 and to the resonant cavity 904 has been described in detail hereabove. Energy from the resonant cavity 904 is utilized to write data to the medium as has been described hereabove.

The recording head 900 also includes a second resonant cavity device 982 for reading data from a phase change or ablative medium disk. The reading optical device includes a resonant cavity 984, a waveguide 988, a laser optical energy source 992 and an optical energy detector 994 that is coupled to the distal end 996 of the waveguide 988. A suitable detector 994 may comprise an InGaAs or Si photodetector or other photosensor as are well known to those skilled in the art.

Coupling the waveguide 988 to the detector 994 can be accomplished in one of several methods, where the detector generally is an integrated component of the head 900. One coupling method is depicted in FIGS. 9B and 9C, in which a grating coupler including grating lines 995 is formed on a surface of the distal end 996 of the waveguide 988. Alternatively, light can be directly coupled from the end 996 of the waveguide to the detector 994.

In performing a "read" operation, the light source 992 can operate at reduced power in either pulsed or continuous wave mode such that the light reaching the medium does not change its surface condition. Since the light traverses areas of high reflectivity and low reflectivity material in the medium, the intensity of the light coupled from the waveguide 988 to the cavity 984 varies according to the amount of light absorbed by the medium. The light that is not coupled to the cavity is transmitted out to the distal end 996 of the waveguide 988. This signal is inversely proportional to the absorbtivity of the written "bits". Therefore the waveguide output of the distal end 996 is either high or low as the light traverses low or high reflectivity areas, respectively. This is interpreted as a binary signal by the detector 994 for data retrieval purposes.

For phase-change materials, an erase operation to reset the surface condition of the medium may be necessary. Generally, this requires low power annealing of the material such that it is always below the melting temperature. To execute such an operation, the light source is operated in a reduced power mode but above that for the read operation. Certain phase-change materials may require different light source conditions for the overwrite, write, and read operations. The differences can be in power density, duration of heating, and dimensions of the heating spots. Also, it may be desirable to have reset/erase preceding write or write preceding read. In this respect, a second or even a third resonant cavity device of similar constructions can be integrated into the same recording head to provide different near-field heating conditions. An example of a read-after-write arrangement is shown in FIGS. 9A, 9B and 9C where each cavity is coupled to its own waveguide, and the write cavity is uptrack of the read cavity.

The method for reading and writing data to a phase change medium disk can be simplified by using only one resonant cavity device, and a recording head 1000 that is adapted for both writing and reading operations in a single resonant cavity is described with the aid of FIGS. 10A, 10B and 10C, wherein FIG. 10A is a plan view of the ABS surface of a recording head 1000, FIG. 10B is a cross-sectional view taken along lines 10B-10B of FIG. 10A, and FIG. 10C is a side elevational view of FIG. 10A. As is depicted in FIGS. 10A, 10B and 10C, the recording head 1000 includes a resonant cavity device 1002 for writing data to an optical disk, such as a phase change media disk. The resonant cavity device 1002 includes an optical energy resonant cavity 1004, a waveguide 1020 and an optical energy source 1056. The resonant optical cavity 1004 may be comprised of any of the resonant cavities 404, 504, 604, 704 or 804 that have been described hereabove, and the coupling of optical energy from a laser source 1056 to a first end 1096 of the waveguide 1020 and to the resonant cavity 1004 has been described in detail hereabove. Energy from the resonant cavity 1004 is utilized to write data to the optical medium as has been described hereabove.

In order to perform a read operation, the recording head 1000 also includes an optical energy detector 1094 that is coupled to a second end 1098 of the waveguide 1020. A suitable detector may be one of the detectors 994 that have been described above. Coupling the waveguide 1020 to the detector 1094 can also be accomplished as described above for the detector 994. Similarly, the "read" and "erase" operations can follow those described above for devices 982 and 902 respectively. The energy of the laser 1056 is reduced in the read operation as compared to the laser energy used in a "write" or "erase" operation.

Another alternative recording head 1100 is depicted in FIGS. 11A, 11B and 11C, wherein FIG. 11A is a plan view of the ABS surface of the recording head 1100, FIG. 11B is a cross-sectional view taken along lines 11B-11B of FIG. 11A, and FIG. 11C is a side elevational view of FIG. 11A. As can be seen in FIGS. 11A, 11B and 11C, the recording head 1100 includes two resonant cavities 1104 and 1108 that are both coupled to the single waveguide 1120. Each cavity 1104 and 1108 is formed with different dimensions that resonate at different wavelengths. A laser optical source 1156, capable of being tuned to the two different wavelengths, is coupled to the waveguide 1120. When the laser source 1156 is tuned to a writing wavelength, with suitable power, the light energy is coupled to the resonant cavity 1104 to perform a write operation on the optical media, as has been described hereabove. When the wavelength of the energy from the laser 1156 is tuned to that of the resonant cavity 1108, optical energy at a lower power is coupled into the cavity 1108 for a reading operation, and a detector 1180 is coupled to the distal end 1184 of the waveguide 1120 to provide a binary data signal. The detector 1180 may be similar to the detector 994 described above.

In summary, this invention describes a mechanism for producing large optical energy fields in small localized areas (on the order of 25 nm across) on an optical disk such as a phase change recording medium. This invention also describes a mechanism for reading data from small localized areas (on the order of 25 nm) in the near-field, and its application to recording for optical storage with 1 Tbits/in$^2$ storage densities. The present invention also includes the use of a square, rectangular or polygonal cavity instead of a conventional circular one. A cavity with a straight boundary may provide better coupling paths than one with a curved boundary, and comparable results will be obtained with such cavities.

While the present invention has been shown and described with regard to certain preferred embodiments, it is to be understood that modifications in form and detail will no doubt be developed by those skilled in the art upon reviewing this disclosure. It is therefore intended that the following claims cover all such alterations and modifications that nevertheless include the true spirit and scope of the inventive features of the present invention.

We claim:

1. An optical recording head, comprising:
   a write head portion and a read head portion, each being disposed proximate an air bearing surface of said recording head;
   said write head portion including an optical resonant cavity being disposed proximate said air bearing surface; and
   said optical resonant cavity including an aperture for directing optical energy from said optical resonant cavity generally perpendicularly to said air bearing surface.

2. An optical recording head as described in claim 1, wherein said read head portion includes a second optical resonant cavity being disposed proximate said air bearing surface; and
   said second optical resonant cavity includes an aperture for directing optical energy from said second optical resonant cavity generally perpendicularly to said air bearing surface.

3. An optical recording head as described in claim 2 wherein said read head portion further includes an optical energy source and an optical energy transmission means to couple optical energy from the source to said second optical resonant cavity, and a photo detector to detect optical energy from said optical energy transmission means.

4. An optical recording bead as described in claim 3 wherein said optical energy transmission means includes a waveguide that is disposed proximate said optical resonant cavity.

5. An optical recording head as described in claim 2, wherein a single optical energy transmission means is utilized to couple optical energy from an optical energy source to both said optical resonant cavity and said second optical resonant cavity.

6. An optical recording head as described in claim 1, wherein said optical resonant cavity is utilized for both said write head portion and said read head portion.

7. An optical recording head as described in claim 1 wherein said write head portion further includes an optical energy source and an optical energy transmission means to couple optical energy from the source to said optical resonant cavity.

8. An optical recording head as described in claim 7 wherein said optical energy transmission means includes a waveguide that is disposed proximate said optical resonant cavity.

9. An optical recording head as described in claim 7 wherein said optical energy source is a tunable laser.

10. An optical recording head as described in claim 1 wherein said write head portion further includes a first optical energy source and a first optical energy transmission means to couple optical energy from the first source to said optical resonant cavity, wherein said optical energy transmission means includes a first waveguide that is disposed proximate said optical resonant cavity,
wherein said read head portion includes a second optical resonant cavity being disposed proximate said air bearing surface, said second optical resonant cavity including an aperture for directing optical energy from said second optical resonant cavity generally perpendicularly to said air bearing surface;
wherein said read head portion further includes a second optical energy source and a second optical energy transmission means to couple optical energy from said second source to said second optical resonant cavity, and a photodetector to detect optical energy from said second optical energy transmission means, and
wherein said second optical energy transmission means includes a second waveguide that is disposed proximate said second optical resonant cavity.

11. An optical recording head as described in claim 1 wherein said optical resonant cavity includes a post that is disposed within said optical resonant cavity.

12. An optical recording head as described in claim 11 wherein said post is comprised of a metal such as silver, gold, aluminum, rhodium, platinum and chromium.

13. An optical recording head as described in claim 11 wherein said post is comprised of a dielectric material that is coated with a metal film comprised of a material such as silver, gold, aluminum, rhodium, platinum and chromium.

14. An optical recording head as described in claim 11 wherein said post is disposed at a resonant antinode of optical energy within said optical resonant cavity.

15. An optical recording head as described in claim 1 wherein said aperture is formed with a subwavelength dimension compared to the wavelength of optical energy within said optical resonant cavity.

16. An optical recording head as described in claim 1 wherein said optical resonant cavity is comprised of a material of relatively higher index of refraction than proximate exterior material and said aperture is comprised of material of index of refraction different from that of the cavity material.

17. An optical recording head as described in claim 1 wherein said optical resonant cavity is sized for to allow for WGM resonant modes within said cavity.

18. An optical recording head as described in claim 1 wherein said optical resonant cavity is sized to allow for WGM resonant modes and includes a post disposed at an antinode and parallel to a central axis of said cavity, and said post is comprised of a metal such as silver, gold, aluminum, rhodium, platinum and chromium.

19. An optical recording head as described in claim 18 wherein said post is comprised of a dielectric material that is coated with a metal film comprised of a material such as silver, gold, aluminum, rhodium, platinum and chromium.

20. An optical recording head as described in claim 1 wherein said write head portion further includes a near-field aperture disposed between said optical resonant cavity and said air bearing surface.

21. An optical recording head as described in claim 20 wherein said near-field aperture includes an opening that is axially aligned with said aperture of said optical resonant cavity.

22. An optical recording head as described in claim 21 wherein said near-field aperture is formed as a thin film comprised of a metal such as silver, gold, aluminum, rhodium, platinum and chromium.

23. An optical recording head as described in claim 21 wherein said opening is formed in a C or H shape.

24. An optical drive, comprising:
at least one optical disk being fabricated for rotary motion upon an optical drive, said optical disk having a heat sensitive optical recording medium layer disposed thereon;
at least one recording head adapted to fly over said optical disk for writing data on said optical disk, said recording head including:
a write head portion and a read head portion, each being disposed proximate an air bearing surface of said recording head;
said write head portion including an optical resonant cavity being disposed proximate said air bearing surface; and
said optical resonant cavity including an aperture for directing optical energy from said optical resonant cavity generally perpendicularly to said air bearing surface.

25. An optical drive as described in claim 24, wherein said read head portion includes a second optical resonant cavity being disposed proximate said air bearing surface; and
said second optical resonant cavity including an aperture for directing optical energy from said second optical resonant cavity generally perpendicularly to said air bearing surface.

26. An optical drive as described in claim 25 wherein said read head portion further includes an optical energy source and an optical energy transmission means to couple optical energy from the source to said second optical resonant cavity, and a photodetector to detect optical energy from said optical energy transmission means.

27. An optical drive as described in claim 26 wherein said optical energy transmission means includes a waveguide that is disposed proximate said optical resonant cavity.

28. An optical drive as described in claim 25, wherein a single optical energy transmission means is utilized to couple optical energy from an optical energy source to both said optical resonant cavity and said second optical resonant cavity.

29. An optical drive as described in claim 24, wherein said optical resonant cavity is utilized for both said write head portion and said read head portion.

30. An optical drive as described in claim 24 wherein said write head portion further includes an optical energy source and an optical energy transmission means to couple optical energy from the source to said optical resonant cavity.

31. An optical drive as described in claim 30 wherein said optical energy transmission means includes a waveguide that is disposed proximate said optical resonant cavity.

32. An optical drive as described in claim 30 wherein said optical energy source is a tunable laser.

33. An optical drive as described in claim 24 wherein said write head portion further includes a first optical energy source and a first optical energy transmission means to couple optical energy from the first source to said optical resonant cavity, wherein said optical energy transmission means includes a first waveguide that is disposed proximate said optical resonant cavity, wherein said read head portion includes a second optical resonant cavity being disposed proximate said air bearing surface, said second optical resonant cavity including an aperture for directing optical energy from said second optical resonant cavity generally perpendicularly to said air bearing surface;

wherein said read head portion further includes a second optical energy source and a second optical energy transmission means to couple optical energy from said second source to said second optical resonant cavity, and a photodetector to detect optical energy from said second optical energy transmission means, and wherein said second optical energy transmission means includes a second waveguide that is disposed proximate said second optical resonant cavity.

34. An optical drive as described in claim 24 wherein said resonant cavity includes a post that is disposed within said resonant cavity.

35. An optical recording head as described in claim 34 wherein said post is comprised of a metal such as silver, gold, aluminum, rhodium, platinum and chromium.

36. An optical recording head as described in claim 34 wherein said post is comprised of a dielectric material that is coated with a metal film comprised of a material such as silver, gold, aluminum, rhodium, platinum and chromium.

37. An optical drive as described in claim 34 wherein said post is disposed at a resonant antinode of optical energy within said optical resonant cavity.

38. An optical recording head as described in claim 24 wherein said aperture is formed with a subwavelength dimension compared to the wavelength of optical energy within said optical resonant cavity.

39. An optical drive as described in claim 24 wherein said optical resonant cavity is comprised of a material of relatively higher index of refraction than proximate exterior material and said aperture is comprised of material of index of refraction different from that of the cavity material.

40. An optical recording head as described in claim 24 wherein said optical resonant cavity is sized to allow for WGM resonant modes within said cavity.

41. An optical recording head as described in claim 24 wherein said optical resonant cavity is sized to allow for WGM resonant modes and includes a post disposed at an antinode and parallel to a central axis of said cavity, and said post is comprised of a metal such as silver, gold, aluminum, rhodium, platinum and chromium.

42. An optical recording head as described in claim 41 wherein said post is comprised of a dielectric material that is coated with a metal film comprised of a material such as silver, gold, aluminum, rhodium, platinum and chromium.

43. An optical drive as described in claim 24 wherein said write head portion further includes a near-field aperture disposed between said optical resonant cavity and said air bearing surface.

44. An optical drive as described in claim 43 wherein said near-field aperture includes an opening that is axially aligned with said aperture of said optical resonant cavity.

45. An optical drive as described in claim 44 wherein said near-field aperture is formed as a thin film comprised of a metal such as silver, gold, aluminum, rhodium, platinum and chromium.

46. An optical drive as described in claim 44 wherein said opening is formed in a C or H shape.

* * * * *